(12) United States Patent
Dirand

(10) Patent No.: US 6,807,899 B2
(45) Date of Patent: Oct. 26, 2004

(54) ELECTRIC COOKING APPLIANCE HAVING A TANK ASSOCIATED WITH A POURING DEVICE

(75) Inventor: Pascal Dirand, Marsannay-la-Cote (FR)

(73) Assignee: SEB S.A., Ecully (FR)

( * ) Notice: Subject to any disclaimer, the term of this patent is extended or adjusted under 35 U.S.C. 154(b) by 11 days.

(21) Appl. No.: 10/728,785

(22) Filed: Dec. 8, 2003

(65) Prior Publication Data

US 2004/0112227 A1 Jun. 17, 2004

(30) Foreign Application Priority Data

Dec. 6, 2002 (FR) .............................. 02 15458

(51) Int. Cl.⁷ ................................ A47J 37/12
(52) U.S. Cl. ............................ 99/403; 99/330; 99/410; 219/438; 219/439
(58) Field of Search ................ 99/326–333, 444–450, 99/403–417, 467, 471; 126/20, 369, 391.1; 210/167, DIG. 8; 219/438, 439, 430–433, 400, 401; 222/572; 220/912

(56) References Cited

U.S. PATENT DOCUMENTS

| 2,744,524 A | | 12/1956 | Krause et al. | |
| 3,463,077 A | * | 8/1969 | Lescure | 99/403 |
| 3,801,331 A | * | 4/1974 | Sano et al. | 99/403 |
| 4,672,179 A | * | 6/1987 | Onishi et al. | 219/441 |
| 5,029,519 A | * | 7/1991 | Boyen | 99/341 |
| 5,388,732 A | | 2/1995 | Greger | |
| 5,400,700 A | * | 3/1995 | Bois | 99/403 |
| 5,429,039 A | * | 7/1995 | Chang | 99/331 |
| 5,584,234 A | * | 12/1996 | Baillieul et al. | 99/403 |
| 5,701,805 A | * | 12/1997 | Sa | 99/331 |
| 5,794,520 A | * | 8/1998 | Hefford | 99/323.3 |
| 5,839,357 A | * | 11/1998 | Ha et al. | 99/337 |
| 5,996,477 A | * | 12/1999 | Bois et al. | 99/403 |
| 6,283,015 B1 | * | 9/2001 | Kwon et al. | 99/337 |
| 6,499,390 B1 | * | 12/2002 | Huang | 99/331 |

FOREIGN PATENT DOCUMENTS

| BE | 1 013 920 | 12/2002 |
| DE | 100 06 730 | 8/2001 |
| FR | 1 052 038 | 1/1954 |

* cited by examiner

Primary Examiner—Timothy F. Simone
(74) Attorney, Agent, or Firm—Browdy and Neimark, P.L.L.C.

(57) ABSTRACT

An electric cooking appliance composed of: a tank for holding a cooking liquid; a housing in which the tank is mounted, the housing having an upper opening; an upper peripheral rim surrounding the upper opening, the upper peripheral rim being provided with an indentation; and a pouring accessory constructed to be removably mounted in the indentation to facilitate the pouring of the cooking liquid out of the tank.

18 Claims, 6 Drawing Sheets

ELECTRIC COOKING APPLIANCE HAVING A TANK ASSOCIATED WITH A POURING DEVICE

BACKGROUND OF THE INVENTION

The present invention concerns the technical field electric cooking appliances having a housing in which is mounted a tank provided to receive a cooking liquid. The present invention concerns, in particular, but not exclusively, electric fryers.

Electric cooking appliances of the type mentioned above can have a tank that is fixedly or removeably mounted in the housing. Appliances having a fixed tank are fabricated more economically but are less convenient to use than appliances with a removable tank. In effect, pouring of the cooking bath out of the tank is more difficult in the case of appliances with a fixed tank.

In known cooking appliances having a tank that is fixedly mounted in a housing; the housing has an upper rim surrounding the edge of the tank, the upper rim of the housing being higher than the tank, with the exception of an indentation provided for installation of an articulation of a lid. The lid is mounted to be removable from the housing. The indentation facilitates pouring out of the cooking liquid contained in the tank. However, this arrangement allows the cooking liquid to flow along the lateral wall of the housing, particularly at the end of the pouring procedure.

BRIEF SUMMARY OF THE INVENTION

The present invention provides an electric cooking appliance having a tank that is fixedly mounted in a housing, in which pouring out of the cooking liquid is facilitated.

For this purpose, the invention provides an electric cooking appliance having a tank mounted in a housing presenting an upper opening, an upper peripheral rim surrounding the upper opening, and an indentation, or cut-out, being provided in the upper peripheral rim, wherein the appliance further has a removable pouring accessory arranged to be mounted in the indentation. This arrangement allows the pouring out of cooking liquid from the tank to be facilitated. The removable nature of the pouring accessory facilitates construction of the tank and/or of the housing.

According to one advantageous form of construction, the pouring accessory mounted in the indentation has a collection zone opening into the indentation, the collection zone communicating with a pouring zone that opens at the outside of the tank and the housing. Other embodiments can be envisioned, such as an embodiment having a collection zone that partially or totally blocks, or closes, the tank or the upper peripheral rim of the housing.

Advantageously then, the pouring zone protrudes from the housing when the pouring accessory is mounted in the indentation. This arrangement contributes to preventing the cooking bath from dripping onto the sidewall of the housing.

The pouring accessory has a lower wall and, advantageously also, the pouring accessory has lateral walls that converge toward the pouring zone. This arrangement contributes to accelerating the speed at which the liquid flows and promotes the attainment of a jet, or stream, that has a greater spacing from the sidewall of the housing.

Also advantageously, the lateral walls of the pouring accessory are connected together by an upper wall. This arrangement contributes to increasing the rigidity of the pouring accessory. This arrangement also contributes to channeling the stream of cooking liquid. This arrangement also facilitates gripping of the accessory by allowing it to be seized at a point between its upper wall and its lower wall. In addition, the upper wall can be arranged in a manner to not increase the overall size of the accessory, thereby facilitating storage.

According to a further advantage, the indentation, or cutout, has a threshold that is higher than the collection zone of the pouring accessory when the accessory is mounted in the indentation. This arrangement helps to suppress the creation of turbulences in the cooking liquid in the tank as the liquid enters the collection zone.

According to a further advantage of the invention, the pouring accessory has a transverse structure provided to cooperate, or engage, with a longitudinal structure provided in the indentation. This arrangement permits an easy installation of the pouring accessory and also permits construction of the appliance to be simplified. This arrangement also makes it easier to create a tight seal between the accessory and the indentation, although a separate sealing joint could be provided if necessary or desired.

According to further features of the invention, the pouring accessory has a retaining hook provided to cooperate with a projection provided in a wall of the housing. In order to facilitate positioning of the pouring accessory, an elastic foot connects the hook to a lower wall of the accessory. Also advantageously, in order to facilitate withdrawal of the accessory, an unlocking tongue is mounted on the elastic foot.

According to an advantageous embodiment, the upper peripheral rim is part of the housing. According to another embodiment, the upper peripheral rim can belong at least in part to the tank, particularly when the tank is fabricated by molding. The indentation can then be formed in the upper edge of the tank.

According to an advantageous arrangement, the appliance has a device that is removable with respect to the housing, said device comprising a support adapted to be positioned in the indentation. Thus, it is not necessary to provide a separate indentation only for introduction of the pouring accessory. The support can, in particular, be part of a device for raising and lowering a basket disposed in the tank, or a device for articulating, or pivoting, a lid associated with the housing.

According to an advantageous embodiment, the appliance has a lid for closing the housing. In further accordance with the invention, to facilitate pouring, the lid is removable with from the housing.

Also advantageously, the lid is mounted in an articulated manner with respect to the housing and the indentation is disposed substantially diametrically opposite the point of articulation of the lid about the upper opening. The lid is preferably removable. This arrangement in particular permits the same indentation to be used to support a device for raising and lowering a cooking basket and to support the pouring accessory.

Also advantageously, the appliance has a receptacle provided to receive the pouring accessory for storage. Further, the receptacle can be formed in the lid and may be closed by a hood, or cover.

DETAILED DESCRIPTION OF THE INVENTION

Figure 1:
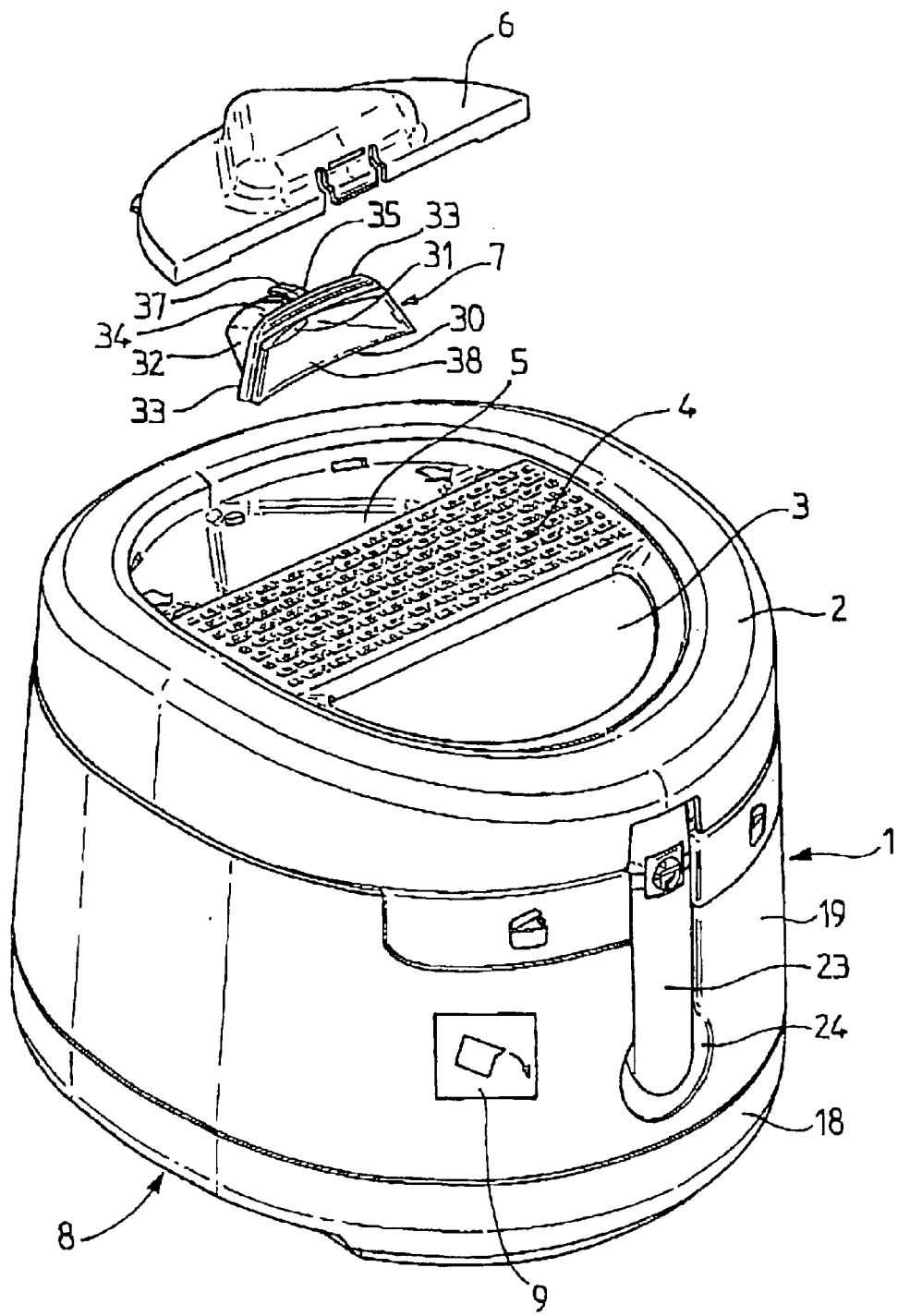
FIG. 1 is a perspective view of an embodiment of the invention in which a hood and a pouring accessory are shown in exploded form.

FIG. 1 shows an embodiment of a fryer according to the present invention having a housing 1 closed by a lid 2 that is removably mounted on housing 1. Lid 2 has a window 3, a filtration device 4 and a receptacle 5 closed by a removable hood, or cover, 6. Receptacle 5 is provided to receive a pouring accessory 7. Housing 1 includes two gripping means 8 arranged diametrically opposite one another at the housing base and one of which is visible in FIG. 1. Housing 1 is composed of a base 18 and a skirt 19 that surmounts base 18. The gripping means are arranged in base 18.

Figure 2:
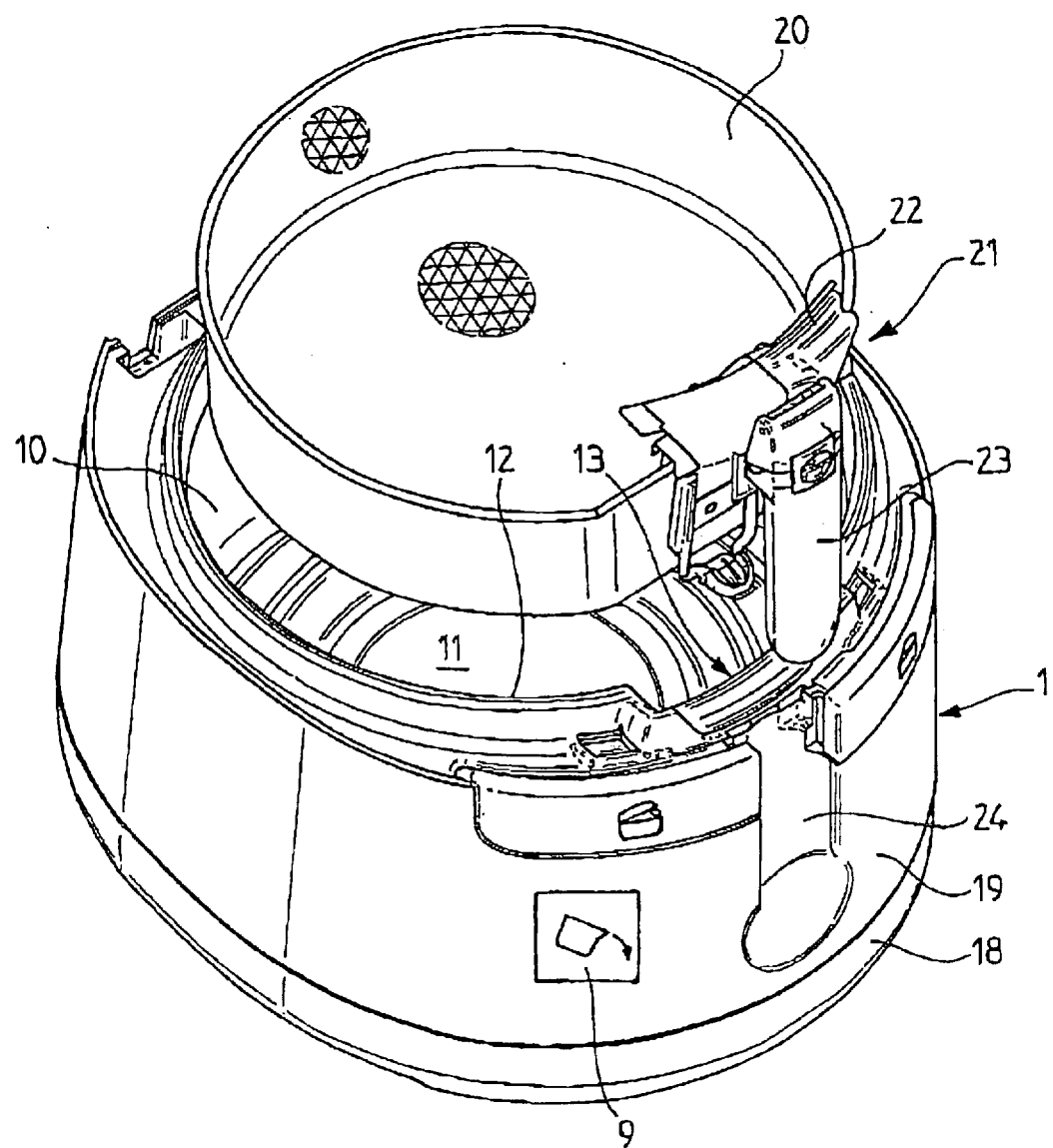
FIG. 2 is a perspective view of the same embodiment in which the lid of the appliance has been removed and a cooking basket and raising and lowering device are shown in exploded form.

As shown in FIG. 2, a tank 10 is housed in housing 1. Tank 10 is associated with conventional heating means (e.g., electric heating element 40 in FIG. 5). Housing 1 has an upper opening 11 that is delimited, or bounded, by an upper peripheral rim 12. Tank 10 is installed in housing 10 so that rim 12 forms an upper prolongation of tank 10. An indentation, or cutout, 13 is arranged in rim 12.

The fryer is further provided with openwork basket 20 for holding food that is to be fried in tank 10. Indentation 13 is provided to receive a support 22 of a device 21 for raising and lowering basket 20. Typically, basket 20 is constituted by a wire mesh, the mesh being only partially depicted in FIG. 2. Indentation 13 is disposed substantially diametrically opposite to a pivot, or articulation, arrangement provided between lid 2 and housing 1.

Device 21 is composed of support 22, attached to basket 20, and a handle 23 attached to support 22 and provided to allow the user to raise and lower support 22, and thus basket 20, relative to housing 1. FIG. 2 shows handle 23 in a position corresponding to the lowered position of basket 20. Housing 1 has a recess 24 in its sidewall for receiving handle 23 when in the lowered position, with support 22 in place in indentation 13. The exact configuration of handle 23 and support 22 are not novel features of the invention and can be easily arrived at by those skilled in the art so that these features will not be described in further detail herein.

Figure 3:
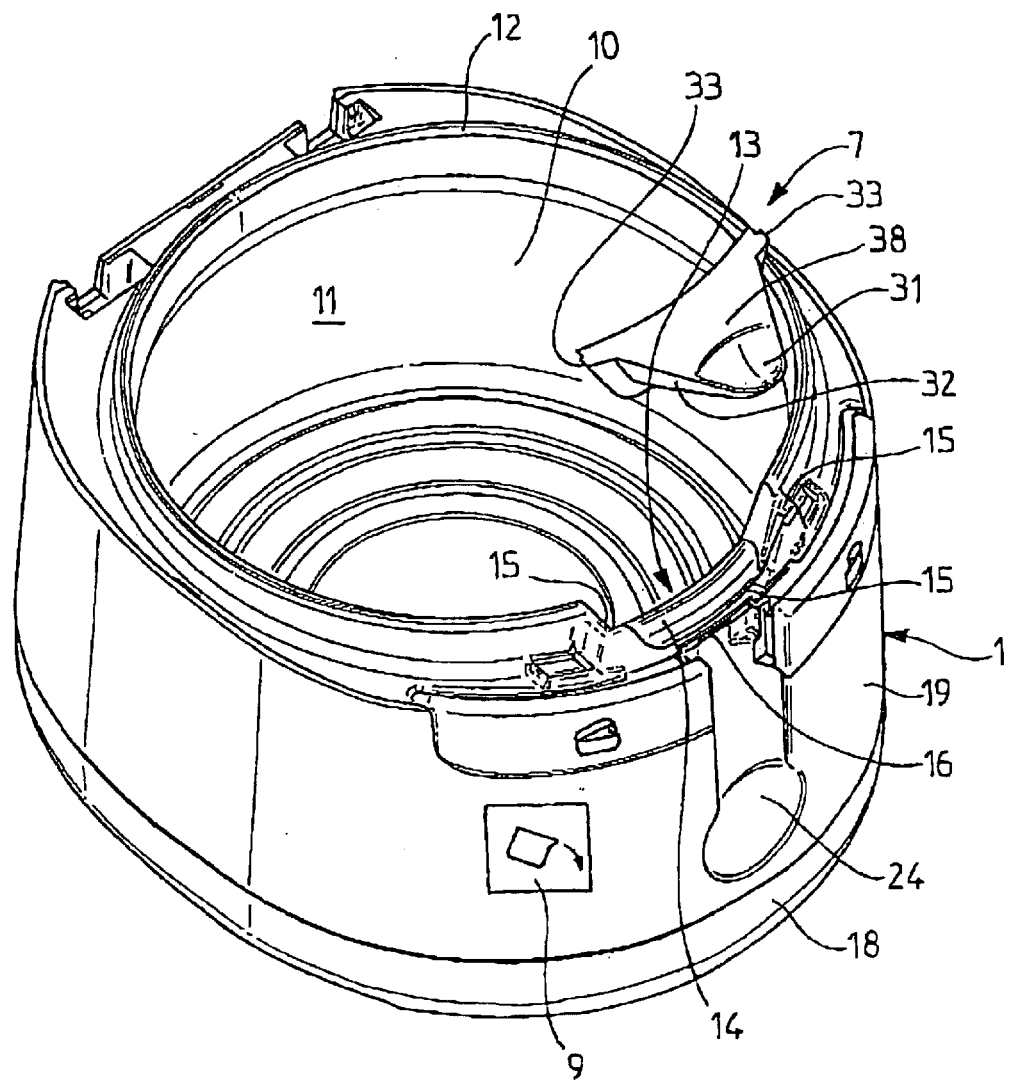
FIG. 3 is a perspective view of the same appliance, with the basket and raising and lowering device removed and the pouring accessory shown in exploded form.

As is seen more clearly in FIG. 3, the bottom edge of indentation 13 is constituted by a threshold, or sill, 14. Indentation 13 is associated with a structural part 15 of rim 12 that delimits an opening in the form of a pocket. Structural part 15 is located between threshold 14 and housing 1. The lateral wall of housing I is provided with an inwardly extending projection 16 located in recess 24. This projection is seen most clearly in FIG. 5.

Pouring accessory 7, as shown particularly in FIGS. 1 and 3–8, has a collection zone 30 and a pouring zone 31 defined by two lateral walls 32 connected together by a lower wall 34. Lateral walls 32 converge toward pouring zone 31. Accessory 7 has, on the outer surfaces of lateral walls 32 and lower wall 34, a transverse part, or structural element, 33 provided to cooperate with projecting longitudinal structural part 15. Transverse part 33 is connected to the outer surfaces of lateral walls 32 while passing beneath, and being connected to, the outer surface of lower wall 34. Part 33 may be in the form of a transverse rib.

Figure 5:
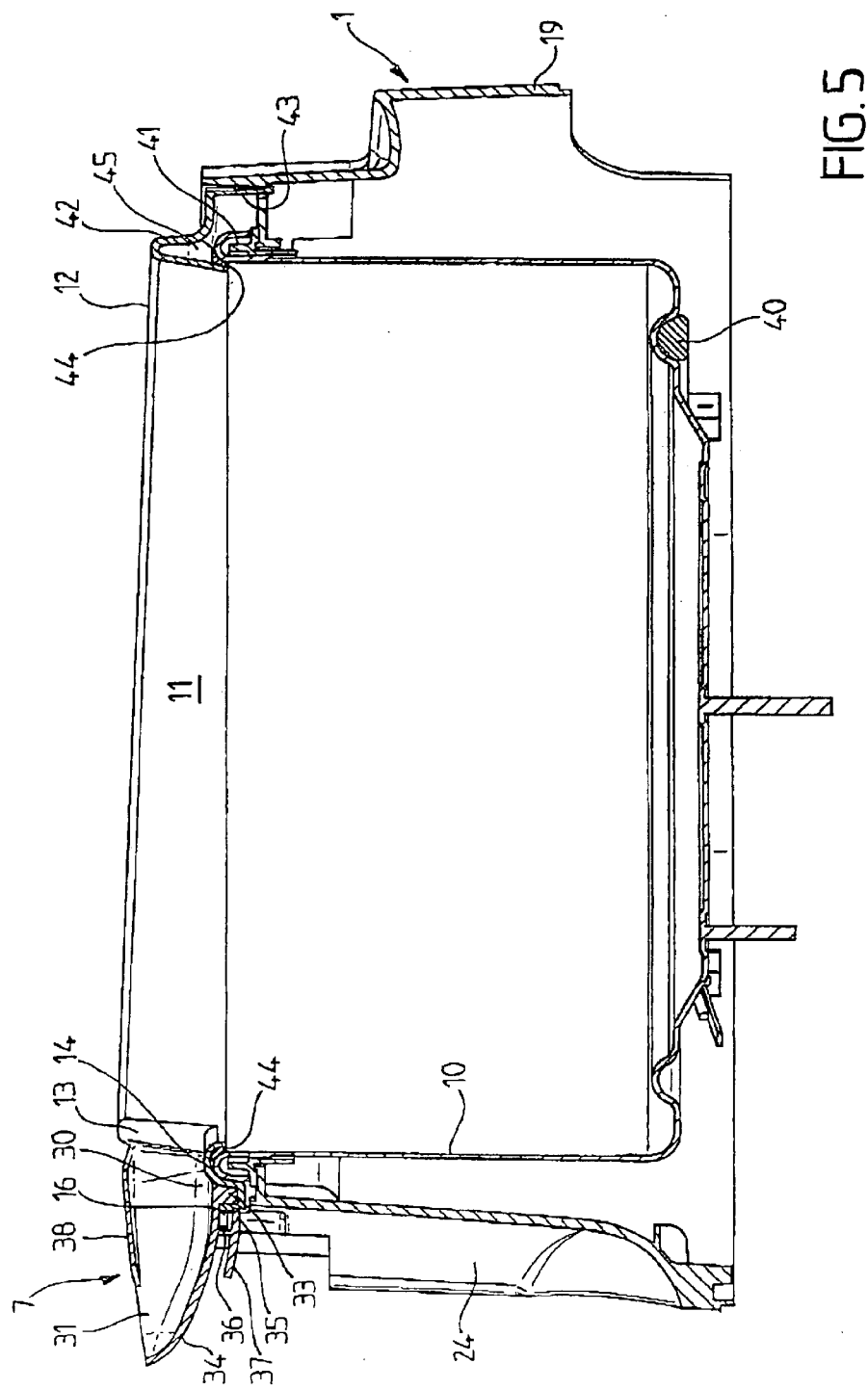
FIG. 5 is an elevational, cross-sectional view taken along line V—V of FIG. 4, with the lower part of the housing of the appliance not shown.
Figure 6:
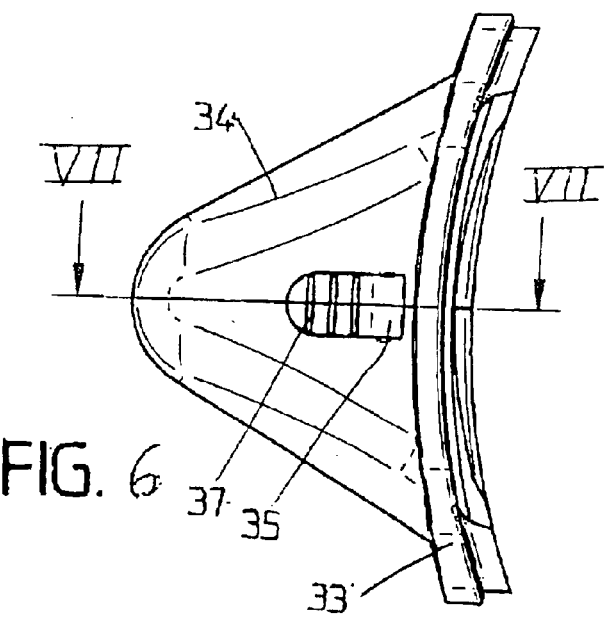
FIGS. 6, 7 and 8 are, respectively, a bottom plan view, an elevational cross-sectional view along line VII—VII of FIG. 6 and a perspective view of a preferred embodiment of a pouring accessory according to the invention.
Figure 7:
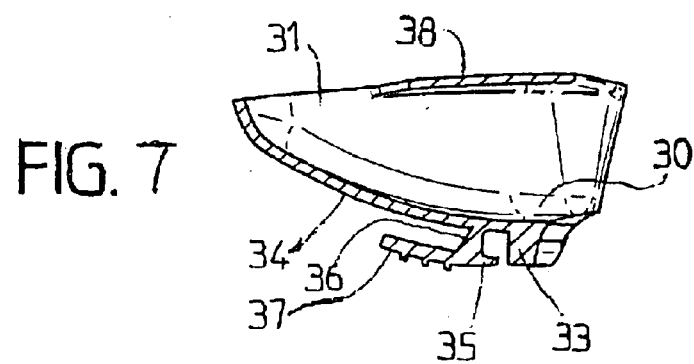
Figure 8:
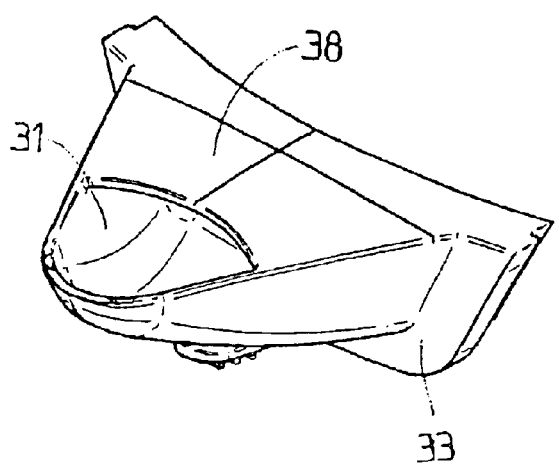

Accessory 7 further has a retaining hook 35 located under lower wall 34, and visible particularly in FIGS. 1 and 5. It should be noted that in FIG. 1 accessory 7 is inverted relative to its orientation when mounted in indentation 13. An elastic foot 36 connects lower wall 34 to hook 35 and to an unlocking tongue 37. Accessory 7 further has an upper wall 38 that connects lateral walls 32 in proximity to collection zone 30, for increasing the rigidity of accessory 7.

Figure 4:
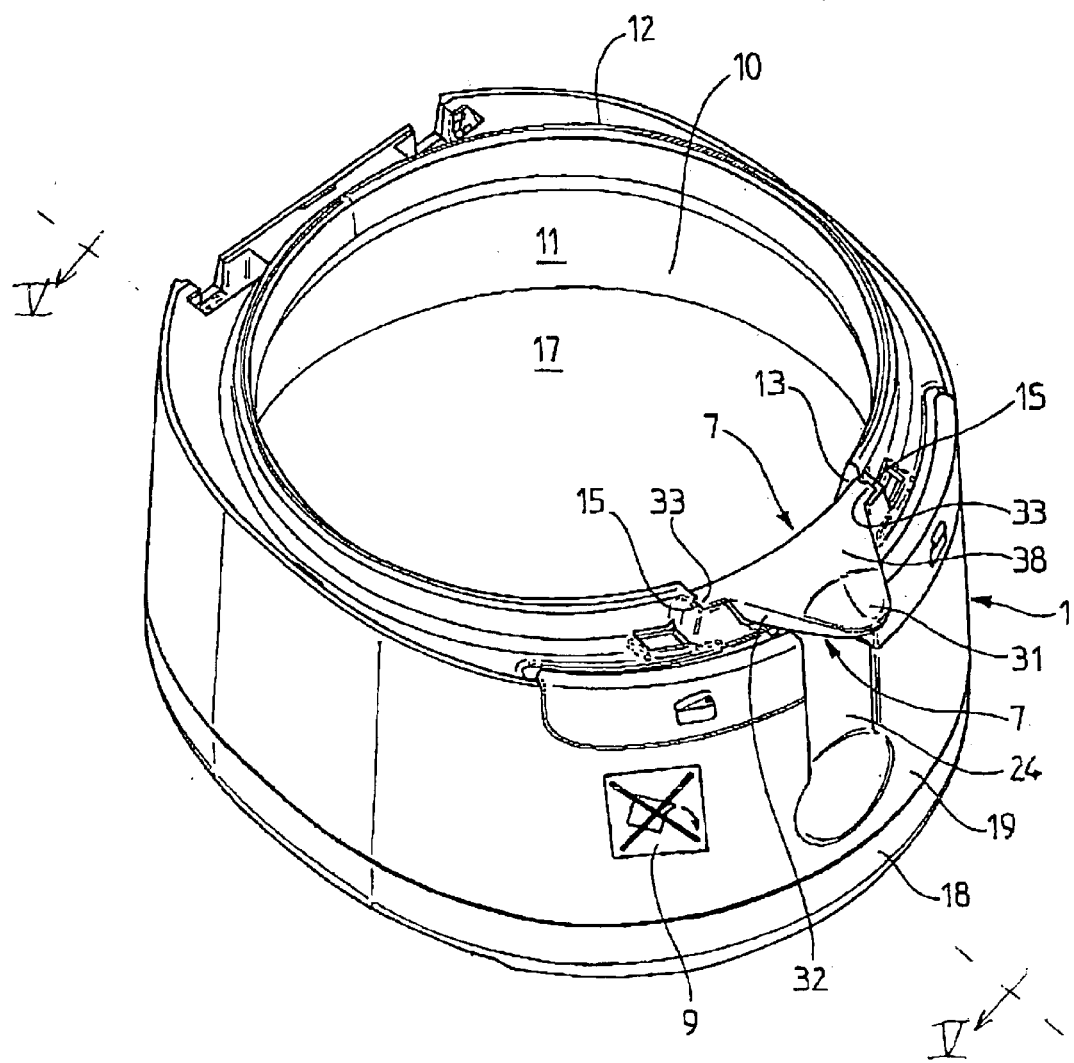
FIG. 4 is a perspective view of the same embodiment, with the pouring accessory in place.

FIG. 4 shows tank 10 with basket 20 removed and accessory 7 installed in indentation 13. Tank 10 may contain containing a cooking liquid in space 17. An indicating device 9 disposed on housing 1 can provide the user with an indication not to pour out the cooking liquid as long as its temperature is above a certain level. Indicating device 9 can be a display element coupled to, and controlled by, a temperature sensor, or can be a pictogram made at least partially of a suitably thermosensitive material that will display the warning indication shown in FIG. 4 when the temperature of the cooking liquid is above a selected temperature.

In FIG. 4, accessory 7 is mounted in indentation 13 so that collection zone 30 opens into the region enclosed by indentation 13. Pouring zone 31 opens to the outside of tank 10 and housing 1 and preferably projects outwardly from housing 1. The rib forming transverse structural part 33 of accessory 7 is inserted into the pocket delimited by longitudinal part 15 of housing 1. Hook 35 is in place under projection 16, which is not visible in FIG. 4.

FIG. 5 shows the structure of skirt 19, tank 10, rim 12 and accessory 7 in greater detail, the base 18 of the housing 1 being not shown. Skirt 19 can, for economic reasons, advantageously be made of a material that is not capable of withstanding, on a long term basis, the temperature reached by the edge of tank 10, one such material being polypropylene. Tank 10 is associated with electric heating means 40 and has a folded over upper edge that rests on an outwardly extending flange of a ring 41 that is supported by a flange carried by, and extending inwardly from, the inner surface of skirt 19. Rim 12 of housing 1 is part of an annular piece 42. Ring 41 and piece 42 may each be made of a material that is capable of withstanding, on a long term basis, the temperature that will be reached by the edge of tank 10, such as for example polybutylene terephthalate (PBTP). The inner extremity of annular piece 42 comes to rest on the upper edge of tank 10. The outer extremity of annular piece 42 is mounted to skirt 19, for example by a snap fit and/or by screws. FIG. 5 also illustrates a snap fit foot 43 forming the outer extremity of annular piece 42 and engaging with skirt 19. The upper edge of tank 10 resting on ring 41 is thus maintained between skirt 19, which supports ring 41 and annular piece 42. An annular sealing joint 44, for example an O-ring, is interposed between tank 10 and annular piece 42. Annular piece 42 is provided with ribs 45 to maintain joint 44 against tank 10. Edge 12 is higher in the region adjacent indentation 13 than at a location diametrically opposed to indentation 13.

In order to empty the cooking liquid contained in tank 10, the user withdraws lid 2 as well as device 21 and basket 20 and than installs pouring accessory 7 into indentation 13 of housing 1. The rib forming the structural part 33 of pouring accessory 7 is engaged in a groove forming the structural part 15 of housing 1, permitting pouring accessory 7 to be held in position radially and laterally, as well as in a sealed manner with respect to housing 1. Hook 35 mounted on elastic foot 36 is pushed by the lateral wall of housing 1 during installation of pouring accessory 7. Hook 35 comes into position under projection 16 of housing 1.

Thus, during pouring, accessory 7 is maintained in place with respect to the housing. Upper peripheral rim 12 permits cooking liquid 17 to be guided toward collection zone 30 of accessory 7. The threshold of indentation 13 being higher than collection zone 30 of accessory 7 when installed in indentation 13, flow of cooking liquid 17 into the collection zone it effectuated while minimizing turbulence; Indicator device 9 warns the user against pouring out the contents of tank 10 when its temperature is too high.

To remove accessory 7, the user must free hook 35 from projection 16. The user can grip accessory 7 by pressing on upper wall 38 on the one hand and on unlocking tongue 37 on the other hand. Unlocking tongue 37 can then be pivoted with respect to the point at which elastic foot 36 is anchored in lower wall 34, which liberates hook 35 from projection 16. The user can then slide the transverse part 33 of accessory 7 into the longitudinal structure 15 of housing 1 in order to withdraw accessory 7 from housing 1. The outer surface of upper wall 38 and unlocking tongue 37 are spaced from the flow path of the cooking liquid and are not soiled during emptying of tank 10, which facilitates handling. Accessory 7 can be stored in receptacle 5 of housing 1, which can be closed by hood 6.

By way of a variation, indentation 13 is not necessarily disposed diametrically opposite the articulation point of lid 2. Indentation 13 is not necessarily provided to receive support 22 of device 21 for raising and lowering basket 20. Indentation 13 can in particular receive a support of a device for pivoting lid 2 and this lid is not necessarily mounted in a pivoting manner with respect to the housing, but can simply be placed on, and removed from, housing 1. Furthermore, lid 2 is not necessarily removable from the housing. Upper peripheral rim 12 having indentation 13 does not necessarily form part of housing 1, but alternatively can at least partially from a part of tank 10. Hood 6 closing receptacle 5 is not necessarily removable. Receptacle 5 is not necessarily arranged on lid 2, but can in particular be arranged in a lateral wall of housing 1. Retaining hook 35 is not necessarily disposed under the lower wall 34 of accessory 7, but can in particular be disposed on a lateral wall thereof. The longitudinal groove forming the longitudinal part 15 of housing 1 can be completed or replaced by a longitudinal rib, the transverse rib forming the transverse part 33 of the pouring accessory then being completed or replaced by a transverse groove. Other means than longitudinal part 15 and transverse part 33 can be envisioned to assure maintenance and/or sealing of accessory 7 with respect to rim 12.

This application relates to subject matter disclosed in French Application Number 02 15458, filed Dec. 6, 2002, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . ." and "means for . . .", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. An electric cooking appliance comprising: a tank for holding a cooking liquid; a housing in which said tank is mounted, said housing having an upper opening; an upper peripheral rim surrounding the upper opening, said upper peripheral rim being provided with an indentation; and a pouring accessory constructed to be removably mounted in said indentation to facilitate the pouring of the cooking liquid out of said tank.

2. The appliance of claim 1, wherein said pouring accessory has a collection zone opening into said indentation when said pouring accessory is mounted in said indentation, and a pouring zone that opens at the outside of said tank and said housing, said pouring zone being in fluid flow communication with said collection zone.

3. The appliance of claim 2, wherein said pouring zone protrudes from said housing when said pouring accessory is mounted in said indentation.

4. The appliance of claim 2, wherein said pouring accessory has lateral walls that converge toward said pouring zone.

5. The appliance of claim 4, wherein said pouring accessory further has an upper wall connecting said lateral walls together.

6. The appliance of claim 2, wherein said indentation has a lower edge defining a threshold that is higher than said collection zone of said pouring accessory when said accessory is mounted in said indentation.

7. The appliance of claim 1, wherein said pouring accessory has a transverse structure and said indentation is associated with a structural part with which said transverse structure is arranged to engage when said accessory is mounted in said indentation.

8. The appliance of claim 1, wherein said pouring accessory has a retaining hook and said housing has a wall provided with a projection with which said hook cooperates when said accessory is mounted in said indentation.

9. The appliance of claim 8, wherein said accessory has a lower wall and an elastic foot that connects said hook to said lower wall.

10. The appliance of claim 9, further comprising an unlocking tongue mounted on said elastic foot in order to facilitate removal of said accessory from said housing.

11. The appliance of claim 1, wherein said upper peripheral rim is part of said housing.

12. The appliance of claim 1, further comprising a device that is removable with respect to said housing, said device comprising a support adapted to be positioned in said indentation.

13. The appliance of claim 1, further comprising a lid for closing said upper opening of said housing.

14. The appliance of claim 13, wherein said lid is removable from said housing.

15. The appliance of claim 13, wherein said lid is mounted to said housing at an articulation point and said indentation is disposed substantially diametrically opposite the articulation point about the upper opening.

16. The appliance of claim 13, wherein said lid is provided with a receptacle provided to store said pouring accessory when said accessory is not mounted in said indentation.

17. The appliance of claim 16, further comprising a hood for closing said receptacle.

18. The appliance of claim 1, further comprising a receptacle provided to store said pouring accessory when said accessory is not mounted in said indentation.

* * * * *